Sept. 14, 1954     P. W. ERICKSON ET AL     2,688,998

SEAT ATTACHMENT

Filed Sept. 15, 1951

Inventor
PAUL W. ERICKSON &
MACK H. FRIEDMANN

By *Irving Richtenberg*
                 Attorney

Patented Sept. 14, 1954

2,688,998

UNITED STATES PATENT OFFICE 2,688,998

SEAT ATTACHMENT

Paul W. Erickson, Kansas City, Kans., and Mack H. Friedmann, Kansas City, Mo.

Application September 15, 1951, Serial No. 246,754

4 Claims. (Cl. 155—188)

1

This invention relates to means for increasing the comfort of passengers in any vehicle, such as a railroad coach car, bus or station wagon, which has rows of seats extending from front to rear of the vehicle, and has particular relation to devices which are adapted to be suspended between the backs of the seats of such vehicles.

Generally speaking, the invention consists of a device or attachment which may be removably suspended between the backs of two seats in successive rows and permits the passenger to sit in comfort, either in an erect position or in a reclining position, with feet elevated.

One object of this invention is to provide a removable attachment which may be easily attached and detached from the seats and which supports the passenger's feet in an elevated position.

Another object is to provide a seat attachment which is adapted to connect with other identical attachments so as to produce a series of such attachments.

Another object is to provide a seat attachment which may be partially detached so as to permit the passenger to get in and out of the seat with ease.

Other objects are to provide a seat attachment which is simple and inexpensive to make, which has a simple method of attachment to the seat, and which is adjustable so as to be usable in various types of vehicles having seats of different sizes and having different spacing between seats.

Other objects are to provide such seat attachments having pockets for shoes or other loose articles.

Referring to the drawings.

Figure 1:
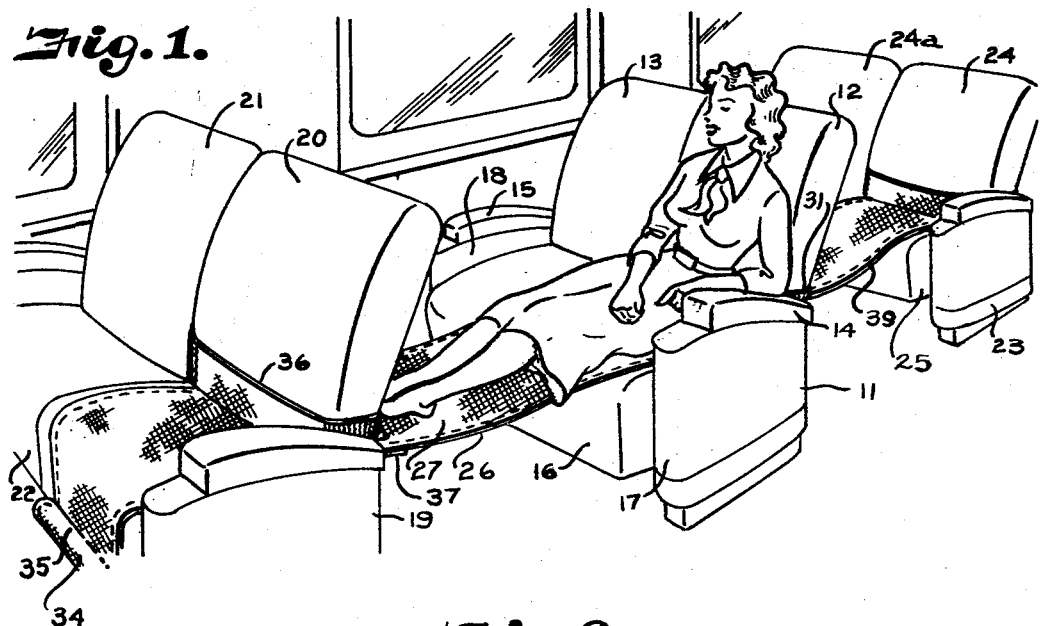
Figure 1 is a fragmentary perspective view of a railroad coach car showing a preferred embodiment of the invention in use.

The conventional railroad coach car has successive rows of seats from front to rear, each row consisting of two seats. As shown in Figure 1, row 11 has adjustable seat backs 12 and 13, arm rests 14 and 15, cushion 16 and seat legs 17 and 18. In front of row 11 is an identical row 19 having seat backs 20 and 21 and cushion 22. In rear of row 11 is another identical row 23 having seat backs 24 and 24a and cushion 25. Additional identical rows, not shown, extend forward and rearward of rows 11, 19 and 23. Seat backs 12, 13, 20, 21, 24 and 24a are normally in a substantially vertical position, but may be tilted backward by conventional means, permitting the passengers to sit either in an upright or in a reclining position.

Figure 2:
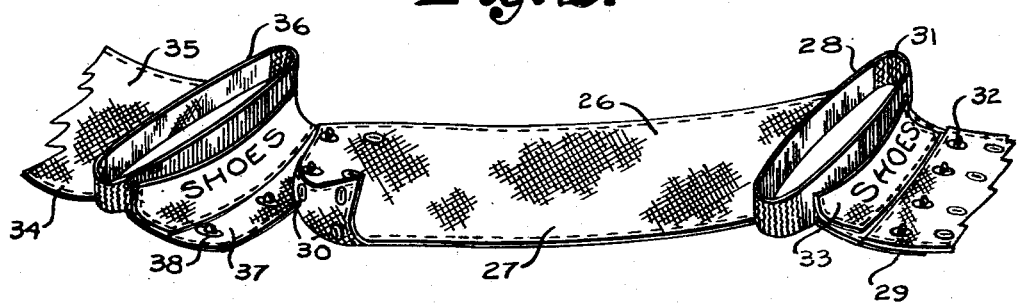
Figure 2 is an illustrative view of the preferred embodiment of the invention showing the manner of connecting successive seat attachments to each other.

As shown in Figure 2, seat attachment 26 comprises a body piece 27, a band 28 and a tail piece 29, all made of canvas, heavy cloth, or similar material.

Body 27 is rectangular in shape and has a width substantially equal to that of seat back 12 and a length approximately equal to the distance between the front of seat back 12 and the rear of seat back 20.

The front portion of body piece 27 has two rows of button holes 30 for releasably attaching the device, as will be explained hereinafter.

Band 28 is permanently stitched to body piece 27 and consists of a continuous loop having gussets 31 of an elastic material, at either end.

Tail piece 29 is permanently stitched to band 28 and carries a row of auto button fasteners 32, spaced so as to be uniform with the spacing of button holes 30.

A compartment or pocket 33 is stitched to band 28 and tail piece 29, so as to hold shoes or other small articles.

Also shown in Figure 2, is a connecting seat attachment 34, which is identical with attachment 26 and has a body piece 35, a band 36 and a tail piece 37, with a row of auto button fasteners 38. As can be seen, the row of auto button fasteners 38 of attachment 34 can be secured to either row of button holes 30 of attachment 26. Likewise, the auto button fasteners 32 of attachment 26 may be secured to the button holes of still a third attachment. Thus it will be apparent that a continuous chain or series of such attachments may be utilized.

To employ the invention, band 28 of attachment 26 is placed over seat back 12 and lowered until body piece 27 rests on seat cushion 16, as shown in Figure 1. The elastic characteristic of gussets 31 permits band 28 to grip seat back 12 securely, holding band 28 in place. Band 36 of connecting attachment 34 is now placed over seat back 20 and lowered until body piece 35 rests on seat cushion 22. Now by securing the auto button fasteners 38 of attachment 34 in either of the rows of buttons 30, attachment 26 is in position for use. If the passenger does not want to use the attachment, the auto button fasteners may be released from the button holes and the body piece allowed to drop in front of the cushion. In Figure 1 attachment 34 is so shown. Likewise shown in Figure 1 is a third identical attachment 39, resting on cushion 25 of row 23.

Figure 3:
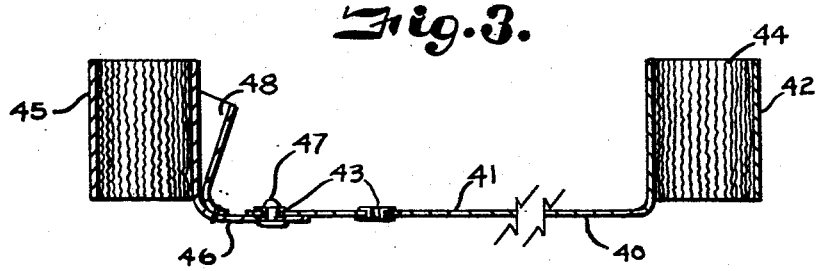
Figure 3 is a cross-sectional view of another embodiment of the invention.

Another embodiment of the invention is shown in Figure 3. This modification is employed where a single passenger desires to use the seat attachment. Modified seat attachment 40 has a body piece 41 and a band 42 similar, respectively, to the body piece 27 and band 28 of attachment 26. Body piece 41 has two rows of button holes 43. Band 42 is permanently stitched to body piece 41 and has elastic gussets 44. In addition, modified attachment 40 has a detachable band 45 which is identical with band 42 except that instead of being stitched to body piece 41 it is removably attached by means of tail piece 46 which carries a row of auto button fasteners 47 adapted to coincide with and engage button holes 43. Shoe pocket 48 is stitched to detachable band 45 and tail piece 46. This modification is employed by lowering band 42 over the back of the passenger's seat and lowering detachable band 45 over the back of the seat immediately in front of the passenger's seat.

Either modification of the invention may be used in vehicles having varying size seat backs and varying spacing between rows of seats. The elasticity of the gussets permits the bands to expand or contract so as to fit seat backs of varying sizes and the rows of button holes permit adjustment to fit situations where the seat rows are at varying distances.

It should be understood that the drawings are illustrative and are not intended to give exact proportions. Neither is the invention limited to particular dimensions or sizes. Variations in size or dimensions may be made without departing from the spirit and scope of the invention. We have found that the auto button fastener works very satisfactorily. However it should be apparent that other releasable fastening devices might be employed. Likewise, more than two rows of button holes might be employed to give greater adaptability.

Having thus described the invention, we claim:

1. A device for increasing the comfort of passengers in a railroad coach or similar vehicle having a series of seats one behind the other, comprising a plurality of similar seat attachments, each of said attachments consisting of a body having a width substantially equal to that of the back of a seat and a length approximately equal to the distance between the front of one seat back and the rear of the seat back in front thereof, fastener means carried by one end of said body, a band having one side attached to the other end of said body and having a periphery approximately equal to that of a seat back, a tail piece attached to the opposite side of said band and a second fastener means carried by said tail piece, said second fastener means complementing said first fastener means.

2. A device for increasing the comfort of passengers in a railroad coach or similar vehicle having a series of seats one behind the other, comprising a plurality of similar seat attachments, each of said attachments consisting of a substantially rectangular body having a length approximately equal to the distance between the front of one seat back and the rear of the seat back in front thereof, fastener means carried by one end of said body, a band having one side attached to the other end of said body and having a periphery approximately equal to that of a seat back and a second fastener means attached to the opposite side of said band, said second fastener means complementing said first fastener means.

3. A device for increasing the comfort of passengers in a railroad coach or similar vehicle having a series of seats one behind the other, comprising a two-piece seat attachment, one piece consisting of a body having a width substantially equal to that of the back of a seat and a length approximately equal to the distance between the front of one seat back and the rear of the seat back in front thereof, fastener means carried by one end of said body, and a band having one side attached to the other end of said body and having a periphery approximately equal to that of a seat back, and a second piece consisting of a second band, a tail piece carried by said second band and a second fastener means carried by said tail piece, said second fastener means complementing said first fastener means.

4. A device for increasing the comfort of passengers in a railroad coach or similar vehicle having a series of seats one behind the other, comprising a two-piece seat attachment, one piece consisting of a substantially rectangular body having a length approximately equal to the distance between the front of one seat back and the rear of the seat back in front thereof, fastener means carried by one end of said body and a band having one side attached to the other end of said body and having a periphery approximately equal to that of a seat back, and a second piece consisting of a second band, and a second fastener means attached to said second band, said second fastener means complementing said first fastener means.

References Cited in the file of this patent

UNITED STATES PATENTS

| Number | Name | Date |
| --- | --- | --- |
| 324,839 | Hazen | Aug. 25, 1885 |
| 400,131 | Small | Mar. 26, 1889 |
| 2,163,198 | Gossard | June 20, 1939 |
| 2,227,180 | Falk | Dec. 31, 1940 |
| 2,348,217 | Jones | May 9, 1944 |
| 2,557,874 | Kailenta | June 19, 1951 |

FOREIGN PATENTS

| Number | Country | Date |
| --- | --- | --- |
| 2,361 | Great Britain | 1912 |
| 49,143 | Germany | July 25, 1911 |